United States Patent Office 3,261,870
Patented July 19, 1966

3,261,870
5-HALO-2-NITRO-BENZOPHENONES AND
PROCESSES FOR THEIR PREPARATION
Albert Israel Rachlin, Hackensack, N.J., assignor to
Hoffmann-La Roche Inc., Nutley, N.J., a corporation
of New Jersey
No Drawing. Filed Apr. 12, 1962, Ser. No. 186,873
13 Claims. (Cl. 260—591)

This invention relates to novel 5-halo-2-nitrobenzophenones and methods for preparing them. More particularly, the compounds of this invention are of the formula

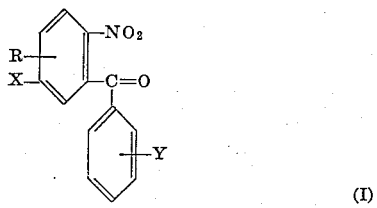

(I)

wherein X is halogen; Y is selected from the group consisting of hydrogen and halogen; and R is selected from the group consisting of hydrogen and lower alkyl.

One embodiment of the invention comprehends a method for the preparation of compounds of Formula I above which comprises treatment of a corresponding 5-halo-2-aminobenzophenone wtih a peracid. Thus, for example, 5-chloro-2-nitrobenzophenone can be prepared from 5-chloro-2-aminobenzophenone. Also compounds with substituents on either phenyl ring, as defined by R and Y above, can be prepared by the method of this invention.

The treatment with the peracid can be effected in any conventional inert organic solvent such as methylene chloride, chloroform, benzene, and the like. It can be conducted at room temperature or at elevated temperatures, for example, at the boiling point of the solvent being used. In a preferred embodiment of the invention, the peracid used is an organic peracid, for example, a carboxylic peracid. Specifically preferred carboxylic peracids are trihaloperacetic acids, such as trifluoroperacetic acid, and permaleic acid. However, other organic peracids, such as peracetic acid, can also be employed.

The above-described conversion of a 5-halo-2-aminobenzophenone to a corresponding compound of Formula I above proceeds through a 3-phenyl-5-haloanthranil intermediate of the formula

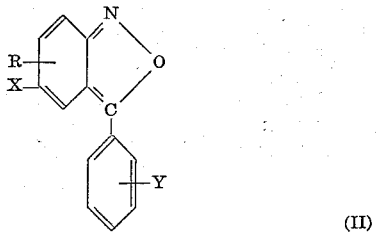

(II)

wherein X, Y and R have the same meaning as above. The conversion of a 5-halo-2-aminobenzophenone to a corresponding compound of Formula I above can be effected with or without isolation of the intermediate anthranil of Formula II above. Thus, the reaction can be conducted in one step, utilizing one peracid, or can be conducted in two steps, utilizing one or two peracids. Thus, for example, an embodiment of the invention comprehends a process which comprises treating a 5-halo-2-aminobenzophenone with one peracid, isolating the intermediate anthranil of Formula II above, and further treating said anthranil with a peracid which can be the same as or different from the first peracid. In a preferred embodiment of the invention, the first peracid is persulfuric acid and the second peracid is a carboxylic peracid. Particularly effective in the second step is the use of trifluoroperacetic acid as the carboxylic peracid.

The compounds of this invention, i.e., the compounds of Formula I above, are useful chemical intermediates. More specifically, they can be converted to corresponding 7-dimethylamino-5-phenyl - 3H - 1,4 - benzodiazepin-2(1H)-ones, which compounds are useful as sedatives, muscle relaxants and anticonvulsants. The conversion of the compounds of Formula I above to the aforesaid corresponding 7-dimethylamino-5-phenyl - 3H - 1,4 - benzodiazepin-2(1H)-ones and various intermediates formed therein are not a part of the instant invention, but such are disclosed hereinbelow in order that the present disclosure may be complete. Thus, in the compounds of Formula I above the 5-halo group is particularly susceptible to reaction with dimethylamine whereby a 2-nitro-5-dimethylaminobenzophenone is obtained. These compounds can then be reduced to corresponding 2-amino-5-dimethylaminobenzophenones, which latter compounds, can then, in turn, be reacted with, for example, glycine ethyl ester hydrochloride in the presence of pyridine, whereby there is obtained a 7-dimethylamino-5-phenyl-3H-1,4-benzodiazepin-2(1H)-one.

The following examples are illustrative but not limitative of the invention. All temperatures are stated in degrees centigrade.

Example 1

A suspension of 10.8 cc. of 90% hydrogen peroxide in 250 cc. of methylene chloride contained in a 1-liter flask fitted with a stirrer, reflux condenser and a dropping funnel was cooled with an ice bath. Trifluoroacetic anhydride (67.6 cc., 100 g.) was added over 45 minutes. After stirring for an additional 5 minutes, the ice bath was removed and a solution of 23.2 g. of 2-amino-5-chlorobenzophenone in 100 cc. of methylene chloride was then added thereto over 45 minutes. The resulting warm, dark solution was stirred and refluxed (steambath) for 1 hour. After cooling with a cold water bath, the reaction mixture was washed successively with two 200 cc. portions of ice water, two 200 cc. portions of cold 10% sodium carbonate, and finally with 200 cc. of 10% sodium chloride solution. Emulsions were broken by filtration through a thin pad of diatomaceous earth. The methylene chloride solution was dried over magnesium sulfate and evaporated in vacuo (50°) leaving a thick oily residue which soon crystallized exothermically yielding 2-nitro-5-chlorobenzophenone, which upon recrystallization from 30 cc. of methanol, melted at 87–89°.

Example 2

A mixture of 10.8 cc. of 90% hydrogen peroxide and 250 cc. of methylene chloride contained in a 1-liter flask fitted with a stirrer, reflux condenser and a dropping funnel was cooled with an ice bath. Trifluoroacetic anhydride (67.6 cc., 100 g.) was then added over 45 minutes and after stirring for an additional 5 minutes, the ice bath was removed and a solution of 26.6 g. of 2-amino-2′,5-dichlorobenzophenone in 100 cc. of methylene chloride was added over 45 minutes. The resulting warm, dark solution was stirred and refluxed (steambath) for 1 hour. After cooling with a cold water bath, the reaction mixture was washed successively with two 200 cc. portions of ice water, two 200 cc. portions of cold 10% sodium carbonate and finally with 200 cc. of 10% sodium chloride solution. Emulsions were broken by filtration through a thin pad of diatomaceous earth. The methylene chloride solution was dried over magnesium sulfate and evaporated in vacuo (50°) leaving a thick oily residue which soon crystallized exothermically. Recrystallized first from 425 cc. of ethanol (with use of decolorizing charcoal) and then a second time from 255 cc. of ethanol (with use of decolorizing charcoal), the product, 2-nitro-2',5-dichlorobenzophenone, melted at 110–112°.

*Example 3*

A stirred solution of 46.7 g. of maleic anhydride in 250 cc. of methylene chloride was cooled with an ice bath and 10.8 cc. of 90% hydrogen peroxide was added over 45 minutes. After stirring for an additional 5 minutes, the ice bath was removed and a solution of 23.2 g. of 2-amino-5-chlorobenzophenone in 100 cc. of methylene chloride was added over 45 minutes. The resulting warm solution was stirred and refluxed for 1 hour. After cooling, the reaction mixture was worked up as described for the preparation of 2-nitro-5-chlorobenzophenone in Example 1. The so-obtained crude, semi-solid reaction product was dissolved in methylene chloride, and the solution was then passed through a column containing 320 g. of alumina (Woelm, neutral, Grade I). The methylene chloride eluates yielded 2-nitro-5-chlorobenzophenone as a crystalline product which, when recrystallized from 15 cc. of methanol, melted at 87–89°. It was identical with the 2-nitro-5-chlorobenzophenone obtained from the trifluoroperacetic acid oxidation.

The ether eluates yielded a solid material which upon being fractionally crystallized from ethanol yielded 3-phenyl-5-chloroanthranil, M.P. 113–115°.

The above procedure was repeated in all details, except for the amount of 2-amino-5-chlorobenzophenone which was decreased to one-half, i.e., 11.6 g. The work up was carried only as far as the elution of the chromatogram with methylene chloride. These eluates gave a solid (2-nitro-5-chlorobenzophenone) which, when recrystallized from 20 cc. of methanol, melted at 87–89°. It was identical with the 2-nitro-5-chlorobenzophenone obtained above.

*Example 4*

Utilizing the procedure described for the preparation of 2-nitro-5-chlorobenzophenone in Example 1 and using trifluoroperacetic acid obtained from 10.8 cc. of 90% hydrogen peroxide and 67.6 cc. of trifluoroacetic anhydride in 250 cc. of methylene chloride, and a solution of 25 g. of 2-amino-2'-fluoro-5-chlorobenzophenone in 100 cc. of methylene chloride, there was obtained 2-nitro-2'-fluoro-5-chlorobenzophenone which upon being recrystallized from ethanol, melted at 111–114°.

*Example 5*

Utilizing the procedure described for the preparation of 2-nitro-5-chlorobenzophenone in Example 1 and using trifluoroperacetic acid obtained from 5.4 cc. of 90% hydrogen peroxide and 33.8 cc. of trifluoroacetic anhydride in 125 cc. of methylene chloride, and a solution of 12.3 g. of 2-amino-3-methyl-5-chlorobenzophenone in 50 cc. of methylene chloride, there was obtained 2-nitro-3-methyl-5-chlorobenzophenone which upon being recrystallized from ethanol, melted at 126–129°.

*Example 6*

A mixture of 200 g. of potassium persulfate and 140 cc. of concentrated sulfuric acid was stirred in a 3-liter flask and, with external cooling, 800 g. of crushed ice was added thereto. The flask was then equipped with a thermometer and a dropping funnel and, while the temperature was maintained at 60°, a solution of 40 g. of 2-amino-5-chlorobenzophenone in 500 cc. of glacial acetic acid was added over 2.5 hours. The resulting slurry was stirred at 60° for an additional hour. After cooling, the solid was filtered and washed acid-free with water, yielding crude 3-phenyl-5-chloroanthranil which, after recrystallization from 500 cc. of ethanol, melted at 114–115°. Thin layer chromatography on silica gel showed that there was present in the crude product a small amount of 2-nitro-5-chlorobenzophenone.

*Example 7*

Trifluoroperacetic acid was prepared in the usual way from 4.7 cc. of 90% hydrogen peroxide and 29.4 cc. of trifluoroacetic anhydride in 100 cc. of methylene chloride. A solution of 10.0 g. of 3-phenyl-5-chloroanthranil in 50 cc. of methylene chloride was added over 20 minutes and the resulting warm solution was stirred and refluxed for 1 hour. After cooling with a cold water bath, the reaction mixture was washed successively with two 100 cc. portions of cold water, two 100 cc. portions of cold 10% sodium carbonate solution and finally with 100 cc. of 10% sodium chloride solution. The methylene chloride solution was dried over magnesium sulfate and evaporated in vacuo at 50°. The solid residue, recrystallized from 15 cc. of methanol, gave 2-nitro-5-chlorobenzophenone which melted at 87–89° and was identical with the product obtained directly by the oxidation of 2-amino-5-chlorobenzophenone.

*Example 8*

A suspension of 13.6 cc. of 90% hydrogen peroxide in 75 cc. of chloroform, contained in a 1-liter flask fitted with a stirrer, reflux condenser and a dropping funnel, was cooled with an ice bath. Two drops of concentrated sulfuric acid were added, and then 56.6 cc. of acetic anhydride was added over 30 minutes. The solution was stirred for 15 minutes without cooling, and it was then heated rapidly to boiling. The heater was removed and a solution of 23.1 g. of 2-amino-5-chlorobenzophenone in 50 cc. of chloroform was added over a 25 minute period. The solution boiled gently during this addition. The solution was then stirred and refluxed for 1 hour, after which the reaction mixture was cooled and washed successively with two 300 cc. portions of cold water, two 200 cc. portions of 10% sodium carbonate solution, two 100 cc. portions of 3 N hydrochloric acid and finally with 100 cc. of water. The chloroform solution was dried over magnesium sulfate and evaporated in vacuo, leaving an oily residue.

This material, dissolved in methylene chloride, was passed through a column containing 490 g. of alumina (Woelm, neutral, Grade I). The methylene chloride eluates yielded an oily solid. The ether eluates yielded a solid which, after recrystallization from ethanol, melted at 113–114°, and was identified as 3-phenyl-5-chloroanthranil. The oily solid was dissolved in methylene chloride, and the so-formed solution was passed through a column of 200 g. of alumina (Woelm, neutral, Grade I). The methylene chloride eluates yielded a solid which, from the infrared spectrum was shown to be impure 2-nitro-5-chlorobenzophenone. This was recrystallized three times from methanol, dissolved in methylene chloride and then passed through a column containing 40 g. of alumina (Woelm, neutral, Grade I). The methylene chloride eluates yielded a solid, which after being recrystallized from methanol, melted at 87–89° and was identified as 2-nitro-5-chlorobenzophenone.

I claim:
1. A compound of the formula

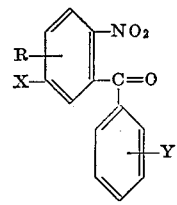

wherein X is halogen; Y is selected from the group consisting of hydrogen, chlorine and fluorine; and R is selected from the group consisting of hydrogen and lower alkyl.
2. 5-chloro-2-nitrobenzophenone.
3. 5-chloro-2'-fluoro-2-nitrobenzophenone.
4. 2',5-dichloro-2-nitrobenzophenone.

5. A process for the preparation of compounds of the formula

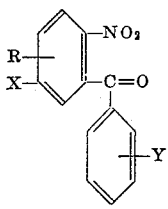

wherein X is halogen; Y is selected from the group consisting of hydrogen, chlorine and fluorine; and R is selected from the group consisting of hydrogen and lower alkyl, which comprises reacting a compound of the formula

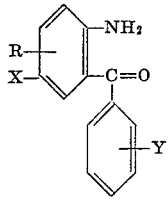

wherein R, X, and Y have the same meaning as above, with a peracid.

6. A process as in claim 5 wherein the peracid is a carboxylic peracid.

7. A process as in claim 6 wherein the carboxylic peracid is permaleic acid.

8. A process as in claim 6 wherein the carboxylic peracid is pertrifluoroacetic acid.

9. A process for the preparation of compounds of the formula

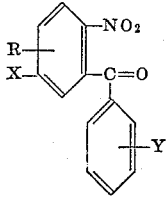

wherein X is halogen; Y is selected from the group consisting of hydrogen, fluorine and chlorine, and R is selected from the group consisting of hydrogen and lower alkyl, which comprises reacting a compound of the formula

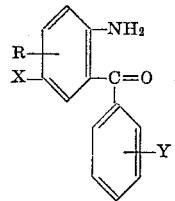

wherein R, X and Y have the same meaning as above, with a first peracid and isolating the so-formed anthranil compound of the formula

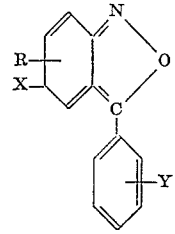

wherein R, X and Y have the same meaning as above, and reacting said anthranil with a second peracid.

10. A process as in claim 9 wherein the first peracid and the second peracid are the same.

11. A process as in claim 9 wherein the first peracid and the second peracid are different.

12. A process as in claim 11 wherein the first peracid is persulfuric acid.

13. A process as in claim 12 wherein the second peracid is pertrifluoroacetic acid.

References Cited by the Examiner
FOREIGN PATENTS
677,458  12/1929  France.

OTHER REFERENCES

Bamberger et al., Ber. Deut. Chem., vol. 36, pp. 3803–12 (1903).

Montagne, Chemical Abstracts 11, 1178' (1917).

Swern, Chem. Reviews, vol. 45, pp. 34, 37 and 38 (1949).

References Cited by the Applicant
Emmons et al., J. Am. Chem. Soc., 77: 2778–88 (1955).

LEON ZITVER, *Primary Examiner.*

LORRAINE A. WEINBERGER, D. D. HORWITZ,
*Assistant Examiners.*